United States Patent
Drozd et al.

(10) Patent No.: US 6,652,952 B2
(45) Date of Patent: Nov. 25, 2003

(54) EXTRUSION HAVING THERMOPLASTIC ELASTOMER CO-EXTRUDED ON CORE WITH ADDITIONAL IONOMERIC SHOW SURFACE

(75) Inventors: Eric J. Drozd, Farmington Hills, MI (US); Sean Scott, Walled Lake, MI (US); Peter Koetsier, Taylor, MI (US)

(73) Assignee: Cooper Technology Services, LLC, Findlay, OH (US)

( * ) Notice: Subject to any disclaimer, the term of this patent is extended or adjusted under 35 U.S.C. 154(b) by 0 days.

(21) Appl. No.: 10/186,759

(22) Filed: Jul. 1, 2002

(65) Prior Publication Data

US 2003/0017302 A1 Jan. 23, 2003

Related U.S. Application Data

(60) Provisional application No. 60/335,522, filed on Oct. 31, 2001, and provisional application No. 60/307,044, filed on Jul. 23, 2001.

(51) Int. Cl.$^7$ ................................................. B32B 3/26
(52) U.S. Cl. ..................... 428/122; 49/475.1; 49/490.1; 428/220
(58) Field of Search ........................ 428/31, 122, 220; 49/475.1, 490.1

(56) References Cited

U.S. PATENT DOCUMENTS

| | | | |
|---|---|---|---|
| 4,291,076 A | 9/1981 | Katoh |
| 4,351,864 A | 9/1982 | Giannakidis |
| 4,937,126 A | 6/1990 | Jackson |
| 5,182,141 A | 1/1993 | Borys et al. |
| 5,182,145 A | 1/1993 | Kato |
| 5,283,100 A | 2/1994 | Yui et al. |
| 5,352,496 A | 10/1994 | Jackson |
| 5,472,544 A | 12/1995 | Fukamachi et al. |
| 5,493,814 A | 2/1996 | Christian |
| 5,618,593 A | 4/1997 | Belser et al. |
| 5,628,150 A | 5/1997 | Mesnel |
| 6,370,824 B1 | 4/2002 | Keeney et al. |

Primary Examiner—Alexander S. Thomas
(74) Attorney, Agent, or Firm—Fay, Sharpe, Fagan, Minnich & McKee, LLP

(57) ABSTRACT

An automotive vehicle molding for enhancing the appearance of a vehicle includes a thermoplastic elastomer main body and an ionomeric show surface. A plastic or metal core member can be embedded in the main body to provide additional stiffness and support. The ionomeric show surface is extruded onto a belt line seal portion or other visible section of the molding. The ionomeric show surface provides a tough, scratch resistant exterior that can easily be colored provided with a glossy surface to improve the aesthetics of the molding and more closely match its appearance with the painted exterior of the vehicle.

15 Claims, 2 Drawing Sheets

EXTRUSION HAVING THERMOPLASTIC ELASTOMER CO-EXTRUDED ON CORE WITH ADDITIONAL IONOMERIC SHOW SURFACE

This application claims benefit of 60/335,522 filed Oct. 31, 2001 and claims benefit of 60/307,044 filed Jul. 23, 2001.

FIELD OF INVENTION

The present invention relates to composite extrusions for use on automotive vehicles. More particularly, the present invention is directed toward a composite extrusion comprising a rigid core embedded within a thermoplastic elastomer and an outer layer comprising one or more ionomeric materials and a method for making the same.

BACKGROUND OF THE INVENTION

It is known to extrude various elastomers to form moldings, such as seals, weather strips and trim strips for use on automotive vehicles. These moldings can be used in a variety of automotive applications, including glass run channels, trim strips, cutline seals, and outerbelt and inner belt seals. Depending on their design and intended use, the various extrusions can be made from a range of materials. The most popular of these materials are elastomer rubbers such as EPDM, which impart good sealing properties and improved weatherability.

Such moldings are typically black in color, due to the difficulties encountered when elastomeric materials are colored or painted. Generally, it is difficult to color or apply a gloss to many of the materials used to make vehicle seals and trim strips. Color does not hold and the resultant molding has a dull appearance.

This characteristic of most elastomeric materials can be a severe drawback, especially in modern vehicles, where there has been a great demand for various weatherseals and trim strips having show surfaces in assorted colors and glosses for aesthetic reasons. It is often required that these show surfaces be coordinated with the high gloss exterior of the vehicle in complementary colors to improve the overall appearance of the vehicle.

One approach used in the automotive industry to solve this problem is to coat an elastomer molding, often reinforced with a metal carrier, with a polyvinyl chloride (PVC), which is available in a wide range of colors, tends to be more colorfast than elastomer rubbers, and is amenable to a high gloss coating. In this method, the elastomer rubber acts as a visually hidden sealant and the PVC is applied to a visually exposed area of the molding. The PVC can be attached to the molding over the elastomer using an appropriate adhesive or a mechanical attachment.

A second approach has been to coat the metal reinforced elastomer molding with a high gloss metal foil layer. The metal foil can be coated with a clear protective polymer coating and presents an even, hard, aesthetically pleasing surface to the exterior of the vehicle.

A third approach calls for extruding the entire molding from a thermoplastic.

Although the above approaches produce acceptable results, they all suffer from various drawbacks. The production and use of a PVC as a show layer is environmentally hazardous and therefore its use requires the taking of special health and safety precautions. In addition, PVC is susceptible to scratching and offers only marginal weatherability resistance.

Likewise, the use of a metal foil show layer suffers from several drawbacks. High gloss metal is quite expensive, thus increasing the cost of the manufactured moldings. In addition, the metal may be easily dented due to its thinness. The use of a thermoplastic to manufacture the entire molding suffers from the fact that thermoplastic does not effectively seal the vehicle from weather. In addition, a thermoplastic molding is typically more expensive to manufacture than an elastomer rubber molding.

Therefore, it would be desirable to develop a molding with a show surface that is amenable to coloring or the application of a high gloss finish that is relatively inexpensive to produce and does not suffer from the above mentioned drawbacks.

SUMMARY OF THE INVENTION

In a first aspect, the invention provides a composite molding for an automotive vehicle including a core member, a main body portion comprising thermoplastic elastomer, and a show layer comprising ionomer disposed on the surface of the main body portion such that the show layer is visible from the exterior of an automotive vehicle when the molding is installed.

In a second aspect, the invention provides a molding for an automotive vehicle including a core member, a thermoplastic elastomer main body having a flange retention channel integral with an oppositely faced glass run channel, and an ionomeric show layer disposed on an outside surface of the glass run channel.

In a third aspect, the invention provides a process for forming a molding for an automotive vehicle, the process including the steps of providing a rigid core member, providing a thermoplastic elastomer, extruding the thermoplastic elastomer to form a main body member, providing an ionomer, extruding the ionomer to form a show layer on a surface of the main body member, applying a high gloss surface to the show layer, and shaping the molding to a final shape for installation in an automotive vehicle.

The invention finds particular usefulness in the manufacture of glass run channel, and outer belts or inner belts in automobiles, although other applications are also contemplated such as other vehicle trim components, weather strips, trim strips, cutline seals, greenhouse moldings, upper auxiliary and glassrun conbinations, etc.

BRIEF DESCRIPTION OF THE DRAWINGS

The present invention will be described in detail with several preferred embodiments and illustrated, merely by way of example and not with intent to limit the scope thereof, in the accompanying drawings.

DETAILED DESCRIPTION OF THE INVENTION

In some glass run channel, a portion of the glass run channel is exposed to view from the exterior and/or interior of the vehicle, thereby also functioning as a trim or decorative piece. This is particularly the case with modern vehicles, which often require that the glass windowpanes be mounted planar or almost planar ("flush mounting") with the adjacent vehicle body surfaces for aesthetic reasons as well as wind noise and coefficient of drag reduction. Such integral trim and glass run channel is often secured to a spot weld flange extending around the window of a door. Such moldings typically have a generally S-shaped cross-section having two oppositely faced channels in which one channel engages over the spot weld flange while the mouth of the other channel cushions and seals the glass.

Figure 1:
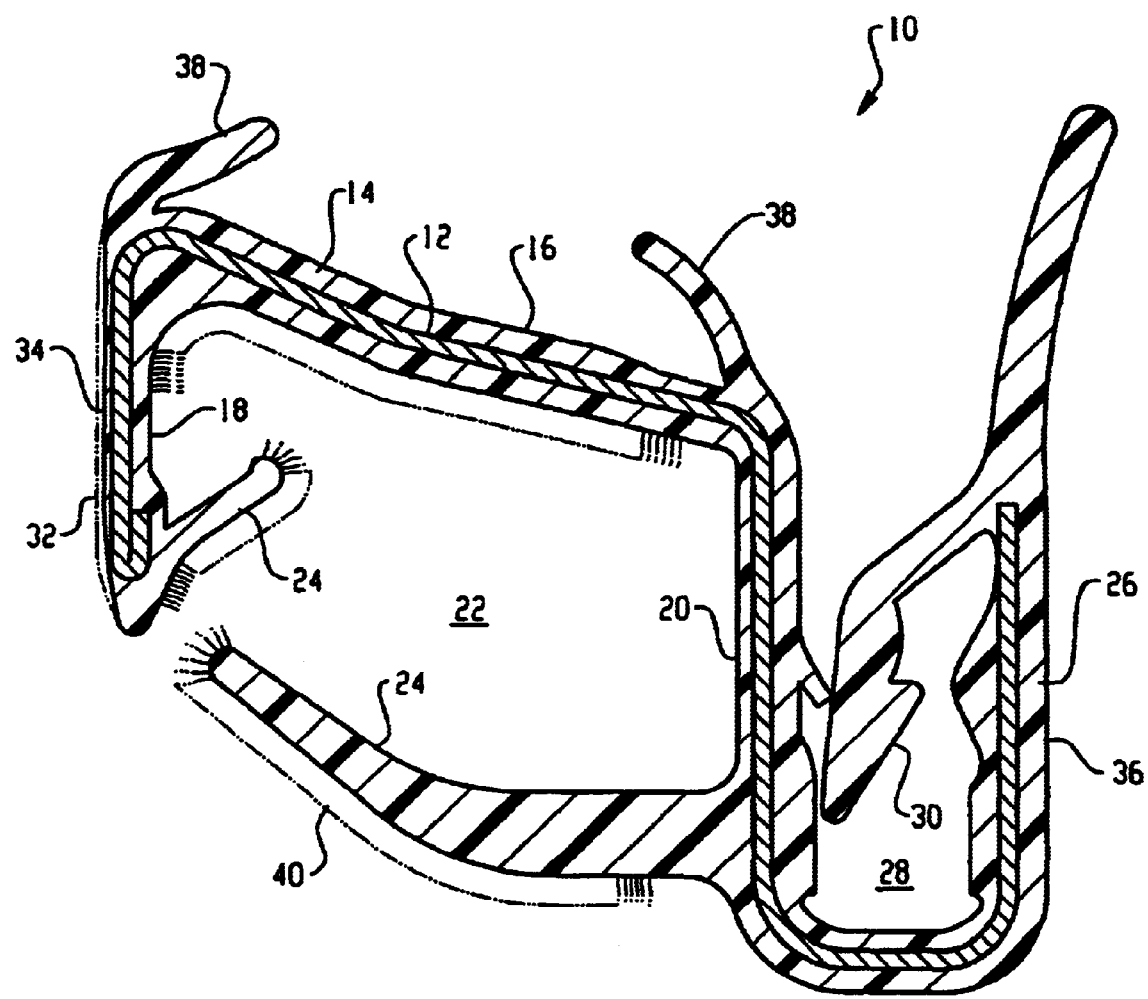
FIG. 1 is a cross-sectional view of an exemplary glass run channel molding in accordance with the present invention.

Therefore, with reference to FIG. 1, a preferred embodiment of an integral trim and glass run channel molding in accordance with the present invention is shown generally at 10. The molding can extend along the entire perimeter of a vehicle door window (not shown). The molding 10 includes an elongated rigid core member 12 in a conventional "S" shaped geometry, the rigid core member 12 extending substantially along an entire longitudinal length of the molding.

The rigid core of the present invention provides reinforcement and strength to the glassrun or outer belt and the rest of the molding. If stretch-bending (detailed below) is required, the core can be made from any material having a relatively high yield strength and good ductility, giving it the ability to be stretched and bent to form structures that retain their form when stress is released, without splitting or uncontrolled deformation. The rigid core can be a single member, a coiled wire or a continuous or discontinuous series of links.

Many metals provide a good combination of these properties, with aluminum and, to a lesser extent, steel or stainless steel being the preferred materials for the rigid core. The core used for the glassrun or outer belt may be of a low yield and low elongation material if stretch-bending is not required, such as certain aluminum and steel compositions, thermoplastic, or a combination of metal and thermoplastic. A thermoplastic core is preferably extruded and likewise a combined metal/thermoplastic core is co-extruded.

A thermoplastic elastomer main body member 14 substantially covers the entire rigid core. The thermoplastic elastomer body member 14 is formed having a connecting wall 16 joined on either transverse side to substantially vertical first 18 and second 20 side walls. Together, the connecting wall 16 and first 18 and second 20 side walls define a flange retention channel having an interior cavity 22 adapted to retain or receive an edge or portion of a glass window (not shown). Attached to one or both first 18 and second 20 side walls and directed inward toward the interior cavity 22 are one or more glass guiding and sealing members 24 to engage a car window (not shown). The second side wall 20 curves over to form a third wall 26, the second wall 16 and third wall 24 being substantially parallel and defining a flange retention channel oppositely facing the flange retention channel and having a U-shaped cavity 28 which, when mounted on a vehicle, substantially encloses a flange of a vehicle body panel (not shown). Attached to one or both second 20 and third 26 side walls and directed inward toward the U-shaped cavity 28 are one or more retention members 30 for securing the molding to the vehicle body panel. Additional retention spurs 38 on the thermoplastic elastomer member 14 can be used for additional strength in securing the molding to the vehicle body.

The thermoplastic elastomer of the present invention can be any of a number of materials exhibiting a good combination of weatherability, flexibility, heat aging properties and dimensional stability. The thermoplastic elastomer must be susceptible to forming and be able to follow the contours of an outer body panel of a vehicle. Suitable thermoplastic elastomers include, but are not limited to, various block copolymers such as styrenic, polyester or polyurethane block copolymers; thermoplastic/elastomer blends such as thermoplastic polyolefins and thermoplastic vulcanizates, particularly copolymers of a polyolefin and EPDM; and ionomeric thermoplastic elastomers. Preferably, the thermoplastic elastomer used in the present invention will have a Shore A hardness of from about 55 to 75. This range provides the required stiffness necessary to provide effective support while still being soft enough to provide effective sealing. In addition, the material must be able to resist chemical attack from conventional automotive cleaning products as well as pass industry specification tests for seal and trim strips. A preferred group of thermoplastic elastomers for use in the present invention are a class of dynamically vulcanized PP/EPDM materials available under the trademark SANTOPRENE™ and commercially available from Advanced Elastomer Systems. Of course, other commercially available TPVs and TPEs may be used as well.

The thermoplastic elastomer of the invention may further comprise various additives known in the art, including, but not limited to pigments, plasticizers, UV absorbers, hindered amine light stabilizers, antioxidants, adhesion promoters, foaming agents, and mixtures of these additives. The total amount of additive may be up to 50% by weight of the composition, depending on what additives are used.

An ionomeric show layer 32 that provides additional scuff resistance and protection as well as an aesthetically pleasing appearance for the molding is provided over the thermoplastic elastomer member 14, preferably co-extruded with the thermoplastic elastomer. The ionomeric show layer 32 is extruded onto the thermoplastic elastomer member 14 at strategic positions on the thermoplastic elastomer member surfaces. Preferably, the ionomeric show layer 32 is extruded on an exterior surface 34 of the glass run channel on the first side wall 18, which faces the exterior of the vehicle and is exposed to view when the molding is deployed in a vehicle. Alternately, or in addition, the ionomeric show layer may be extruded on an exterior surface 36 of the third side wall 26. This exterior surface 36 is exposed to view from the interior of the vehicle when the molding is installed. The ionomer show layer 32 and the thermoplastic elastomer member are typically coextruded, although step extrusion of the ionomer over the thermoplastic elastomer member is also contemplated.

Ionomers are generally ionic copolymers of an olefin, such as ethylene, and a metal salt of an unsaturated carboxylic acid, such as acrylic acid, methacrylic acid or maleic acid. In some instances, an additional softening comonomer such as an acrylate can also be included to form a terpolymer. The pendent ionic groups in the ionomer interact to form ion-rich aggregates contained in a non-polar polymer matrix. The metal ions, such as sodium, zinc, magnesium, lithium, potassium, calcium etc. are used to neutralize some portion of the acid groups in the copolymer resulting in a thermoplastic elastomer exhibiting excellent durability.

The ionomers suitable for the present invention can be formulated according to known procedures such as those set forth in U.S. Pat. No. 3,421,766 or British Patent No. 963,380, with neutralization effected according to known procedures such as those disclosed in Canadian Patent Nos. 674,595 and 713,631, wherein the ionomer is produced by copolymerizing the olefin and carboxylic acid to produce a copolymer having the acid units randomly distributed along the copolymer chain. Of course, other processes can be used without departing from the scope and intent of the present invention.

Preferably, at least about 20% of the carboxylic acid groups of the copolymer are neutralized by the metal ions (such as sodium, potassium, zinc, calcium, magnesium and the like) and exist in the ionic state. Suitable olefins for use in preparing the ionomers include ethylene, propylene, 1-butene, 1-hexene and the like. Suitable unsaturated carboxylic acids include acrylic, methacrylic, ethacrylic, α-chloroacrylic, crotonic, maleic, fumaric, itaconic acids, and the like. Two or more ionomers may be blended to form the ionomeric show layer.

Preferably, the ionomer has a Shore D hardness of at least about 50, more preferably at least 60, which provides the necessary hardness to resist scratches and impacts. At present, one group of preferred ionomers suitable for use in the present invention is available from A. Schulman Co. under the tradename FORMION®. Other commercial ionomers may be used as well, such as various grades of SURLYN™, available from Dupont. The ionomer is typically extruded with a thickness of from about 0.2 mm to about 2.0 mm. A preferred thickness is about 0.8 to about 1.2 mm.

Because of the low haze and/or high clarity of many ionomers, the present moldings are amenable to high gloss finishes with extremely attractive depth of image, which may be combined with selected special effect pigments such as aluminum and pearlescent pigments to produce the bright metallic effects and sparkling colors that are widely used in automobile finishes. The outer ionomeric layer may be supplied with varying gloss outer finishes ranging from no gloss to extremely high gloss (e.g., from dull to over 80 gloss) and can also be produced in a wide range of colors. Methods of applying or inducing a glossy finish are known in the art in which the composition or the surface of the composition is treated to effect a glossy appearance or a separate outer clear coating is applied. These methods include, but are not limited to, the addition of special pigments or glossy coatings, the continuous molding process in which a laminating wheel transfers a glossy surface to a part as it exits from the extrusion process, and flame treating, which causes the outer surface of the part to flow and attain a glossy appearance. If a separate gloss layer is applied to the ionomer, an adhesion layer may be sandwiched between the ionomer and the gloss surface. A specific technique for forming a glossy surface using pigments is described in U.S. Pat. No. 6,017,989, the disclosure of which is incorporated herein by reference.

Such gloss finishes are resistant to weathering for an extended time period and over a wide range of temperatures. The thermoplastic elastomer may also be produced in various colors such that the part may, for example, have a body-colored exterior show surface of ionomer with an inner thermoplastic elastomer surface matched to the interior trim of the automobile.

The ionomeric show layer provides superior characteristics in terms of weatherability, ultraviolet ray resistance, salt solution resistance, oxidation resistance, wear resistance and durability in the face of other environmental conditions typically encountered by an automotive vehicle. These desired characteristics, as well as resistance to potential physical damage caused by scratches, impacts, and other physical conditions, are greatly improved by applying an ionomeric layer having a durometer hardness of approximately 60 Shore D or higher. The thermoplastic elastomer of the molding body may have a softer durometer hardness in order to retain its sealing and weather resistance capabilities. Thus, since ionomeric show layer can be produced with virtually any desired color or gloss level, the appearance of the molding according to the present invention is greatly enhanced, in terms of coordination with the vehicle body color scheme, without sacrificing performance of the weatherstrip molding in the face of environmental or physical conditions.

In addition, various additives, such as coloring agents, fillers, plasticizers and the like may be added to the thermoplastic elastomer and/or the ionomer in such concentrations that do not affect the properties of the materials.

Flock 40 can be added to various surfaces of the thermoplastic elastomer member 14. These surfaces can include the glass guiding and sealing members 24 as well as the surface of the bottom wall 16 adjacent the interior chamber 22. The use of flock to reduce friction between a glass run channel molding and a pane of glass is known, and it can be attached to the molding by use of a hot melt adhesive or by other means known in the art. Alternately, additional ionomer or other low friction coatings may be extruded or otherwise applied to these surfaces as a flock replacement.

Figure 2:
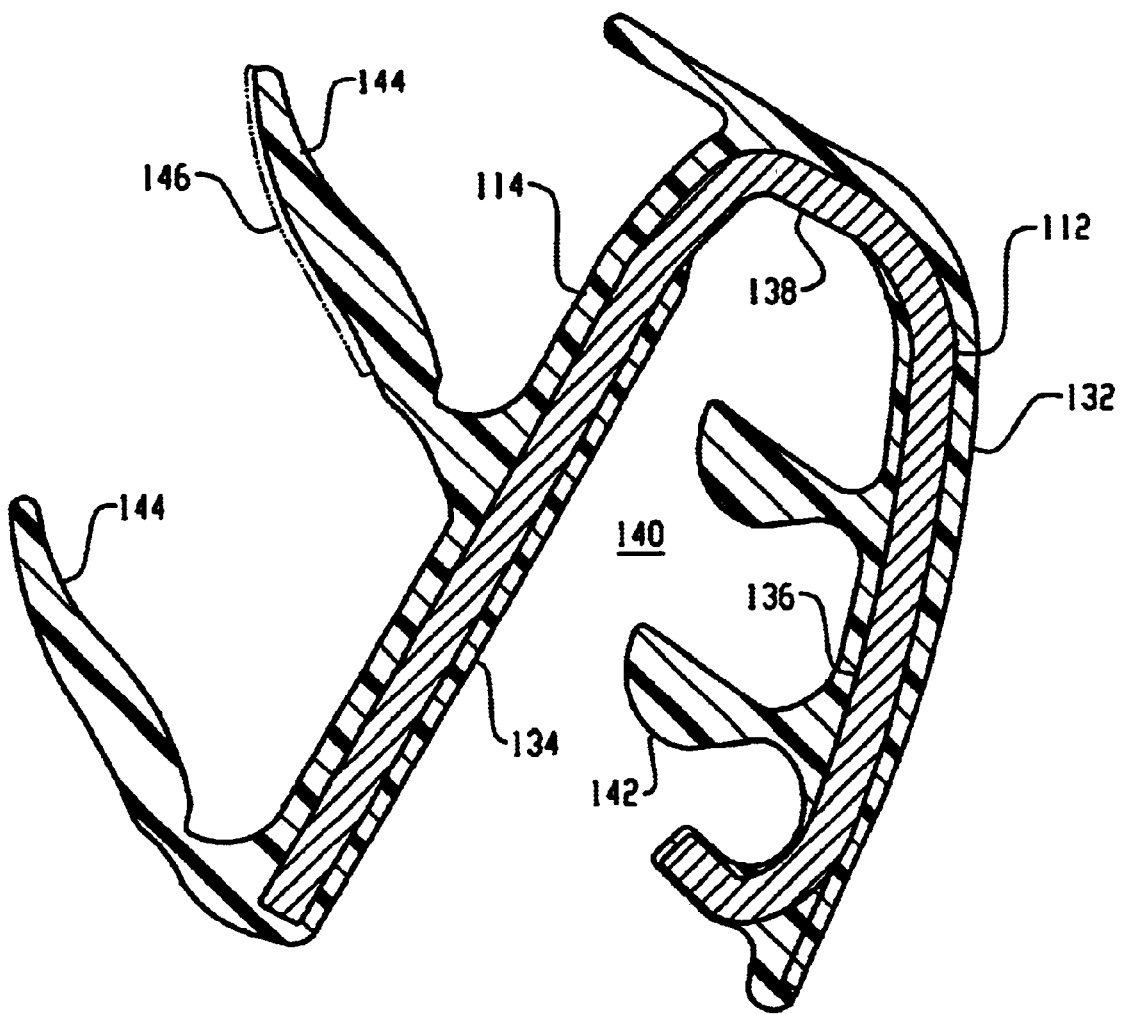
FIG. 2 is a cross-sectional view of an exemplary outerbelt trim molding in accordance with the present invention.

With reference to FIG. 2, a second embodiment of the present invention is shown in which an outerbelt trim molding is provided. The outerbelt trim molding is similar to the glass run channel molding described above and comprises a rigid core 112, a thermoplastic elastomer main body member 114 and an ionomeric show layer 132. The outerbelt molding extends longitudinally along an edge of a vehicle door panel (not shown) and has a general U-shaped cross-section comprised of a first side wall 134, a second side wall 136 and an interconnecting wall 138 together defining an interior cavity 140. One or more flange retention lips 142 extend from one or both first 134 second side 136 walls toward the interior cavity 140 to grip and retain a vehicle door flange (not shown). One or more glass retention lips 144 extend from the first side wall 134 to hold an seal a pane of glass (not shown). Flock or low friction coating 146 may be provided on the glass retention lips to reduce friction between the molding and the glass pane. The materials used in manufacturing the molding are the same respective materials described above for the glass run channel molding.

A preferred method for forming a molding according to the present invention comprises forming a rigid core from a metal, such as aluminum, by cutting a roll of the metal to the desired width. The roll is fed into a mill that forms the cross-sectional shape of the metallic core. Alternatively, the core can be a polypropylene or other suitable thermoplastic, which can be co-extruded or step-extruded with the thermoplastic elastomer, or a combination of a metal core having a suitable rigid thermoplastic received around the metal core. For example, a thinner metal can be used with a rigid thermoplastic coating, such as an extruded polypropylene, provided thereon to serve as a rigid core. The rigid thermoplastic can be extruded around the metal core prior to extrusion of the thermoplastic elastomer, or it can be co-extruded with the thermoplastic elastomer.

The thermoplastic elastomer and the ionomer are then co-extruded from separate extruders onto the rigid core such that the core is surrounded and preferably encapsulated by the thermoplastic elastomer. Various compositions and grades of thermoplastic elastomers may be used, either alone or in combination with other thermoplastics, to provide good sealing, retention and aesthetics for the manufactured part. The ionomer is preferably deposited as a thin layer on the thermoplastic elastomer and provides a show layer on various surfaces of the thermoplastic elastomer. Alternately, the thermoplastic elastomer and the ionomer can be step-extruded, where the thermoplastic elastomer is first extruded onto the rigid core and the ionomer subsequently extruded onto the assembly. The thermoplastic elastomer and the ionomeric show layer can be extruded either through a single extrusion die or separate extrusion dies depending on the extrusion process utilized. Additional low-friction materials may also be co-extruded or step-extruded onto the sealing surfaces of the part to reduce friction and prevent wear and undesirable noises due to movement of the sealing surface relative to the vehicle body contacting surface.

To form the outer belt into its final shape, the assembly is subsequently cut to length. In some applications, the assembly is cut to length and then stretch bent to create the desired appearance. To stretch bend a part, the part is cooled to room temperature. The part is subsequently clamped at certain locations along its length, these locations varying depending on the final shape desired for the part. The part is then simultaneously stretched and bent to the desired shape. In performing this process, care must be taken such that the yield point of the metal core is only slightly exceeded to avoid the possibility of breaking the metal. The metal must be bent such that the elastic limit of the core is exceeded, thereby assuring that the part will retain its form and not revert back to its original shape. This process is typically performed on a glassrun channel or a trim belt applications where the styling requires a sweep to the part to match the sheet metal form.

In summary, a lightweight rigid thermoplastic elastomer belt line seal is provided with flock or low friction coating on the sealing limbs to the glass. The component is dimensionally stable through the manufacturing process and also throughout the full environmental operating range ensuring a consistent fit to the vehicle over time.

The invention has been described with reference to illustrated embodiments. Obviously, modifications and alterations will occur to others upon a reading and understanding of the preceding detailed description. It is intended that the invention be construed as including all such alterations and modifications insofar as they come within the scope of the above description.

What is claimed is:

1. A composite molding for an automotive vehicle comprising:

a core member;

a main body portion comprising thermoplastic elastomer disposed about said core member, said thermoplastic elastomer exhibiting a Shore A hardness of from 55 to 75; and a show layer comprising ionomer disposed on the surface of said main body portion such that said show layer is visible from the exterior of said automotive vehicle when said molding is installed.

2. The molding according to claim 1, wherein said core member comprises one or more of aluminum and thermoplastic.

3. The molding according to claim 1, wherein said show layer has a high gloss surface.

4. The molding according to claim 1, wherein said show layer has a surface of from dull to about 85 gloss.

5. The molding according to claim 1, wherein said show layer has a suitable color to match or complement the exterior bodywork of the automotive vehicle.

6. The molding according to claim 1, wherein said show layer has a thickness of from about 0.2 to about 2.0 mm.

7. The molding according to claim 6, wherein said show layer has a thickness of from about 0.8 to about 1.2 mm.

8. The molding according to claim 1, wherein said ionomer has a Shore D hardness of at least about 50.

9. The molding according to claim 1, wherein said molding is an integral trim strip and glass run channel.

10. The molding according to claim 9, wherein said ionomer has a Shore D hardness of at least 60.

11. The molding according to claim 9, wherein said show layer is disposed on an outside surface of said trim strip.

12. The molding according to claim 1, further including one or more glass guiding and sealing members.

13. A molding for an automotive vehicle comprising:

a core member;

a thermoplastic elastomer main body extending about said core member, said thermoplastic elastomer main body having a flange retention channel integral with an oppositely directed glass run channel; and an ionomeric show layer disposed on an exterior surface of said glass run channel, wherein said show layer has a thickness of from about 0.8 to about 1.2 mm.

14. The molding according to claim 13, wherein said show layer has a surface gloss of from about 50 to about 85.

15. The molding according to claim 13, wherein said show layer has a Shore D hardness of at least 60.

* * * * *